(12) United States Patent
Lin et al.

(10) Patent No.: US 11,429,494 B2
(45) Date of Patent: Aug. 30, 2022

(54) FILE BACKUP BASED ON FILE TYPE

(71) Applicant: EMC IP Holding Company LLC, Hopkinton, MA (US)

(72) Inventors: Chao Lin, Shanghai (CN); Li Sun, Chengdu (CN); Tao Qing, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 274 days.

(21) Appl. No.: 16/804,302

(22) Filed: Feb. 28, 2020

(65) Prior Publication Data

US 2021/0117289 A1 Apr. 22, 2021

(30) Foreign Application Priority Data

Oct. 17, 2019 (CN) .......................... 201910990429.2

(51) Int. Cl.
*G06F 12/00* (2006.01)
*G06F 11/14* (2006.01)
*G06F 16/16* (2019.01)
*G06F 16/182* (2019.01)

(52) U.S. Cl.
CPC ...... *G06F 11/1464* (2013.01); *G06F 11/1453* (2013.01); *G06F 11/1461* (2013.01); *G06F 11/1469* (2013.01); *G06F 16/164* (2019.01); *G06F 16/168* (2019.01); *G06F 16/182* (2019.01)

(58) Field of Classification Search
CPC ............ G06F 11/1464; G06F 11/1453; G06F 11/1461; G06F 11/1469; G06F 16/182; G06F 16/164; G06F 16/168
See application file for complete search history.

(56) References Cited

U.S. PATENT DOCUMENTS

2006/0218435 A1* 9/2006 van Ingen ........... G06F 11/1451
714/6.12

* cited by examiner

*Primary Examiner* — Shawn X Gu
(74) *Attorney, Agent, or Firm* — Chamberlain, Hrdlicka, White, Williams & Aughtry

(57) ABSTRACT

Embodiments of the present disclosure provide a method for file backup, an electronic device and a computer program product. The method comprises: dividing a set of files to be backed up into a plurality of subsets of files, files in each of the plurality of subsets of files being of a same file type. The method also comprises: generating a plurality of backup files based on the plurality of subsets of files respectively, the plurality of backup files corresponding to a plurality of file types of files in the plurality of subsets of files respectively. The method further comprises: generating an overall backup file corresponding to the set of files based on the plurality of backup files.

17 Claims, 6 Drawing Sheets

FILE BACKUP BASED ON FILE TYPE

CROSS-REFERENCE TO RELATED APPLICATIONS

This application claims benefit to Chinese Patent Application 201910990429.2 filed on Oct. 17, 2019. Chinese Patent Application 201910990429.2 is hereby incorporated by reference in its entirety.

FIELD

Embodiments of the present disclosure generally relate to computer systems or storage systems, and more particularly, to a method for file backup, an electronic device and a computer program product.

BACKGROUND

Traditionally, in a file backup of a computer system or a storage system, especially in a file system backup, all the files to be backed up are backed up together within one backup session and a backup file (for example, a container file) is finally generated. For example, a typical user scenario may be that a user selects storage disks "C," "D" and "E" for an on-demand file backup, or those storage disks are selected in a backup policy to perform file backups on the storage disks regularly. In either manner, a deduplication operation is performed on all the file contents in storage disks "C," "D" and "E," and then the file contents are stored as a backup file.

However, for a modern file system, such a traditional backup may have some problems and deficiencies, and thus cannot meet performance requirements of a file backup in many scenarios, thereby resulting in a poor user experience.

SUMMARY

Embodiments of the present disclosure relate to a method for file backup, an electronic device and a computer program product.

In a first aspect of the present disclosure, there is provided a method for file backup. The method comprises: dividing a set of files to be backed up into a plurality of subsets of files, files in each of the plurality of subsets of files being of a same file type. The method also comprises: generating a plurality of backup files based on the plurality of subsets of files respectively, the plurality of backup files corresponding to a plurality of file types of files in the plurality of subsets of files respectively. The method further comprises: generating an overall backup file corresponding to the set of files based on the plurality of backup files.

In a second aspect of the present disclosure, there is provided an electronic device. The electronic device comprises at least one processor and at least one memory storing computer program instructions. The at least one memory and the computer program instructions are configured, with the at least one processor, to cause the electronic device to: divide a set of files to be backed up into a plurality of subsets of files, files in each of the plurality of subsets of files being of a same file type. The at least one memory and the computer program instructions are also configured, with the at least one processor, to cause the electronic device to: generate a plurality of backup files based on the plurality of subsets of files respectively, the plurality of backup files corresponding to a plurality of file types of files in the plurality of subsets of files respectively. The at least one memory and the computer program instructions are further configured, with the at least one processor, to cause the electronic device to: generate an overall backup file corresponding to the set of files based on the plurality of backup files.

In a third aspect of the present disclosure, there is provided a computer program product. The computer program product is tangibly stored on a non-volatile computer readable medium and comprises machine executable instructions. The machine executable instructions, when executed, cause a machine to perform the steps of the method of the first aspect.

It is to be understood that the content of the present disclosure is not intended to limit the scope of the present disclosure. Other features of the present disclosure will be readily understood by the following description.

BRIEF DESCRIPTION OF THE DRAWINGS

Through the following detailed description with reference to the accompanying drawings, the above and other objectives, features, and advantages of example embodiments of the present disclosure will become more apparent. Several example embodiments of the present disclosure will be illustrated by way of example but not limitation in the drawings.

Throughout the drawings, the same or similar reference numerals are used to refer to the same or similar components.

DETAILED DESCRIPTION OF EMBODIMENTS

Figure 1:
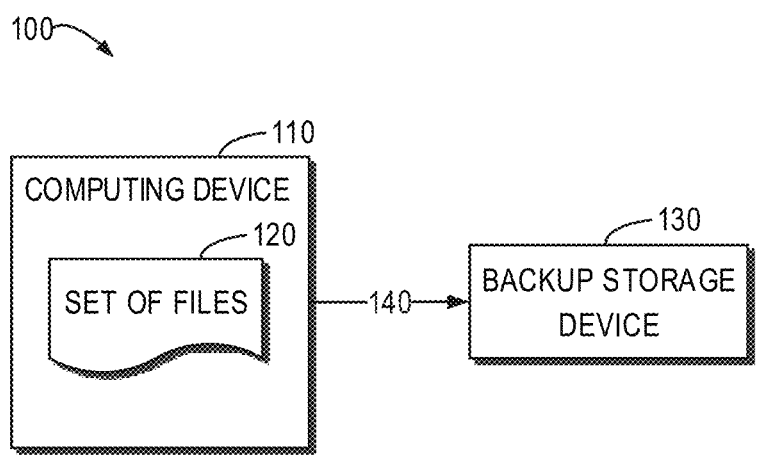
FIG. 1 illustrates a schematic diagram of a file backup system environment in which embodiments of the present disclosure may be implemented.

Principles of example embodiments disclosed herein will now be described with reference to various example embodiments illustrated in the drawings. It should be appreciated that description of those embodiments is merely to enable those skilled in the art to better understand and further implement example embodiments disclosed herein and is not intended for limiting the scope disclosed herein in any manner.

FIG. 1 illustrates a schematic diagram of a file backup system environment 100 in which embodiments of the present disclosure may be implemented. As shown in FIG. 1, the system environment 100 includes a computing device 110 storing a set of files 120. In general, the set of files 120 may be used to organize and manage various files or data in the computing device 110. For example, the set of files 120 may correspond to a file system in a computer system or a storage system. It should be understood that although FIG. 1 shows the set of files 120 as being formed inside the computing device 110, this is merely an example and is not intended to limit the scope of the present disclosure in any way. In some embodiments, the set of files 120 may also be on another computing device different from the computing device 110. For example, the computing device 110 may be a server for providing a backup service and another computing device may be a client to which the computing device 110 is to perform a backup service.

In order to provide protection for files or data in the set of files 120, the computing device 110 may back up the set of files 120 into a backup storage device 130 according to a user's backup instruction, periodically, or based on a pre-determined backup policy. For example, an application for file or data protection may be run on the computing device 110 to perform a backup of the set of files 120. To this end, the computing device 110 and the backup storage device 130 may communicate via a communication link 140. For example, the computing device 110 may transfer the files or data to be backed up to the backup storage device 130 via the communication link 140, obtain various backup files or backup data from the backup storage device 130, and perform any other appropriate file or data communications, or the like.

In addition, the computing device 110 may send control signals to the backup storage device 130 via the communication link 140 to implement various controls, managements, and operations to the backup storage device 130. It should be understood that although FIG. 1 depicts the backup storage device 130 to be external to the computing device 110, this is an example only and is not intended to limit the scope of the present disclosure in any way. In some embodiments, the backup storage device 130 may be included inside the computing device 110 as a component thereof.

In some embodiments, the backup storage device 130 may be a cloud storage system or may be implemented using other remote storage servers. In other embodiments, the backup storage device 130 may be any system with a storage function that provides storage services or functions to a user. In some embodiments, the backup storage device 130 may use various types of devices with a storage function to provide storage functions, including but not limited to, a hard disk (HDD), a solid state disk (SSD), a removable disk, a compact disk (CD), a laser disc, an optical disc, a digital versatile disc (DVD), a floppy disc, a Blu-ray disc, a serial attached small computer system interface (SCSI) storage disc (SAS), a serial advanced technology attached (SATA) storage disc, any other magnetic storage devices and any other optical storage devices, or any combination thereof.

In some embodiments, the computing device 110 may include any device capable of implementing computing functions and/or control functions, including but not limited to, a special-purpose computer, a general-purpose computer, a general-purpose processor, a microprocessor, a microcontroller, or state machine. The computing device 110 may also be implemented as an individual computing device or a combination of computing devices, for example, a combination of a digital signal processor (DSP) and a microprocessor, a plurality of microprocessors, one or more microprocessors in conjunction with a DSP core, or any other such configurations. In addition, in the context of the present disclosure, the computing device 110 may also be referred to as an electronic device 110 and these two terms may be used interchangeably herein.

In some embodiments, the communication link 140 may be any form of connection or coupling capable of enabling data communications or control signal communications between the computing device 110 and the backup storage device 130, including but not limited to, a coaxial cable, a fiber optic cable, a twisted pair, or a wireless technology (such as infrared, radio, and microwave). In some embodiments, the communication link 140 may include various types of buses. In other embodiments, the communication link 140 may include a computer network, a communication network, or other wired or wireless networks.

It should be understood that FIG. 1 only schematically illustrates units, modules, or components in a file backup system environment 100 related to embodiments of the present disclosure. In practice, the file backup system environment 100 may also include other units, modules, or components for other functions. Therefore, the embodiments of the present disclosure are not limited to the specific devices, units, modules, or components depicted in FIG. 1, but are generally applicable to any system environment that can perform a file or data backup.

As mentioned above, for a modern file system, a traditional file backup manner may have some problems and deficiencies, and thus cannot meet performance requirements of a file backup in many scenarios, thereby resulting in a poor user experience. In particular, in traditional file backup manners, all files are mixed together to be backed up in one backup session. For example, in some traditional backup systems, file data may be spread across different branches of a Merkle tree. In other traditional backup systems, file data may be spread across different sections of a container file. During a file recovery, in order to browse recoverable files, two approaches may be used by a user.

The first approach is to read information related to file or directory structure on the fly from metadata of files, and manually select the files to be recovered. The second approach is to use search tools to read and index metadata of files into a cache, and use such cached and indexed metadata to select files to be recovered. However, both above approaches require manual intervention. When the file set or data set is large, it is almost impossible to rely on human selection to filter out the files to be recovered. In this regard, the second aforementioned approach uses cached metadata to enable a search function, which can ease the inconvenience and cumbersomeness for the user to some extent, but it needs to consume central processing units (CPU) and memories to set up the indexed cache, thereby increasing the system overhead.

On the other hand, a modern file system may store files having hundreds or even more file types. When performing a file backup, according to the traditional backup manners, all those files with different file types are backed up into one backup file in one backup session, which may cause issues in two aspects as below.

First, such traditional backup approaches may result in a slow and inconvenient file recovery. For example, a user selects a file system backup because the user may want to do a file level recovery. In other words, the user may not want to recover all files backed up within one backup session because this may be slow and unnecessary. Instead, the user may intend to just recover a certain type of files, for example, audio files (such as, files in a MP3 format, files in a WAV format, or the like), video files (such as, files in a AVI format, files in a MKV format, or the like), picture files (such as, files in a JPEG format, files in a PNG format, or the like), or files of other types. If the traditional backup manners are employed, the user has to manually select intended to be recovered through browsing the backup content, it is very inefficient and inconvenient.

Second, the traditional backup mechanism may result in downgraded deduplication and throughput rate. Specifically, almost all modern backup solutions use deduplication technology to speed up the backup throughput and optimize the storage capacity. Different backup solutions may adopt different deduplication technologies, for example the variable size chunking technology, the fixed sized chunking technology, or the like. However, all these deduplication technologies follow the same rule, namely, data patterns deeply impact the deduplication rate. Additionally, in a large set of files, usually files with the same file type share more similarity. In the traditional backup manners, a backup process mixing all file types together within one backup session cannot take full advantage of data pattern similarity, thereby downgrading the deduplication rate.

Further, with the rapid growth of the file system size and file type complexity, the requirement by a user to recover specific file types are rising. Therefore, a user may not be satisfied with the traditional backup manners which are recovery slow and storage unfriendly, and the user may be impatient to manually select specific files to be recovered, because it is boring and time consuming. In a word, conventional backup and recovery manners with mixed file types cannot fulfill the backup requirements of the user, because the natural-born feature of mixed files makes it not easy to filter files to be recovered according to file types during a file recover process.

In view of the above and other potential problems in traditional solutions, embodiments of the present disclosure propose a technical solution for file backup. In some embodiments, the technical solution realizes an association between a file type and a backup file to improve the file backup and recovery process. In addition, the technical solution provides a simplified and user-friendly approach to perform a file recovery based on file types, by leveraging existing file backup and recovery frameworks. Moreover, the technical solution provides file type based file locality enhancement to improve deduplication and throughput rate. Furthermore, the technical solution provides a reliable multiple-stream solution for a file system backup to reduce backup time. In summary, embodiments of the present disclosure can improve performance of file backup and file recovery. Some example embodiments of the present disclosure are described in detail below with reference to FIG. 2 to FIG. 6.

Figure 2:
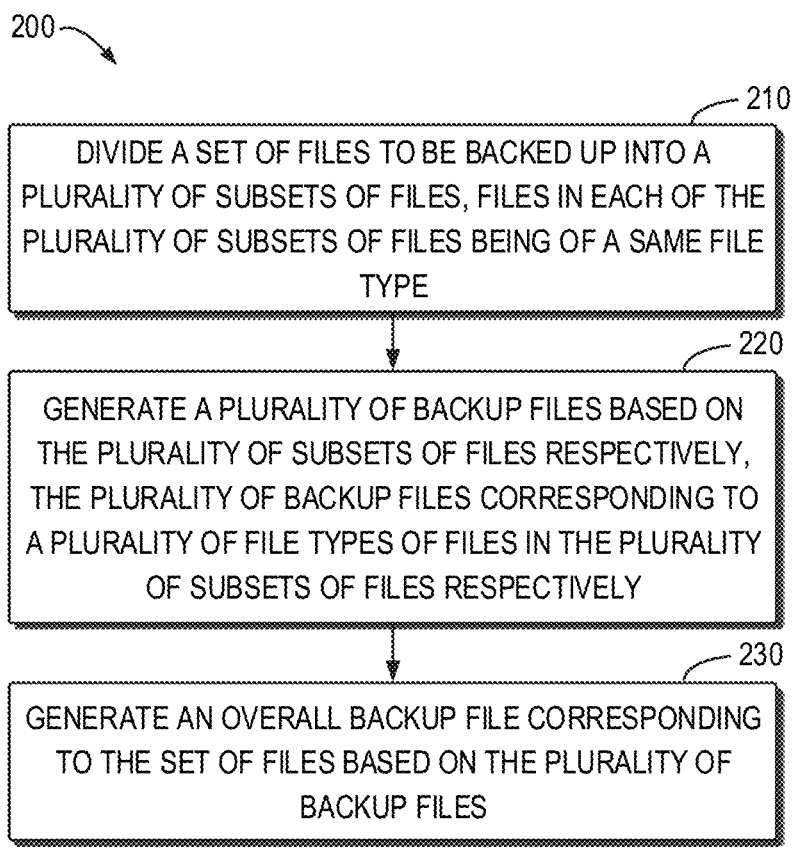
FIG. 2 illustrates a flow chart of an example method in accordance with an embodiment of the present disclosure.

FIG. 2 illustrates a flow chart of an example method 200 in accordance with an embodiment of the present disclosure. In some embodiments, the method 200 can be implemented by the computing device 110 in the file backup system environment 100, for example, by a processor or a processing unit of the computing device 110 or by various functional modules of the computing device 110. In other embodiments, the method 200 can be implemented by a computing device independent from the system environment 100, or by other units or modules in the system environment 100.

Figure 3:
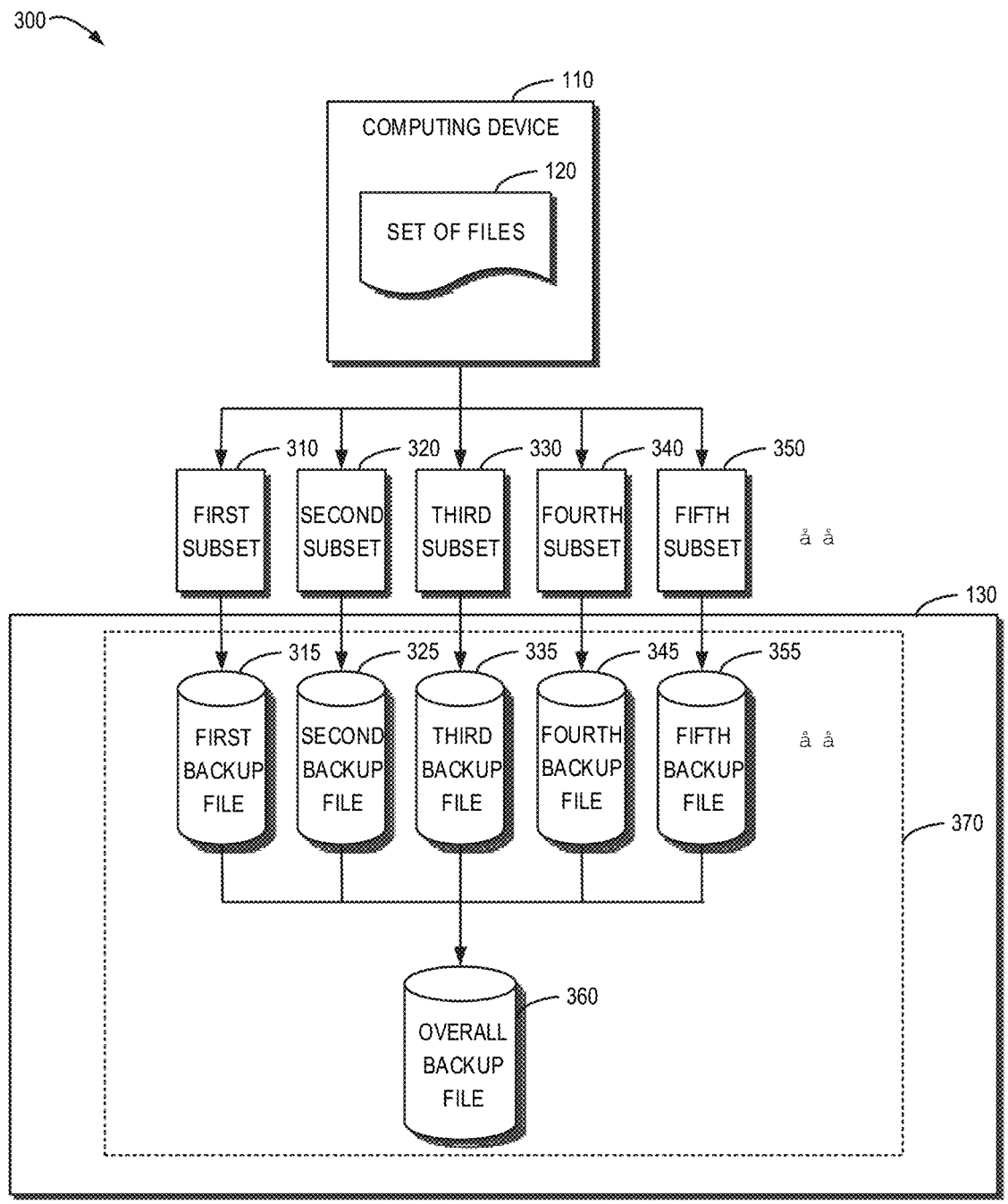
FIG. 3 illustrates an example architecture of a file-type based file backup system in accordance with an embodiment of the present disclosure.

FIG. 3 illustrates an example architecture of a file-type based file backup system 300 in accordance with an embodiment of the present disclosure. In order to better illustrate and explain the process of the computing device 110 performing the method 200, various operations of the method 200 are described below with reference to the example architecture in FIG. 3. However, it is to be understood that the example architecture of the file backup system 300 depicted in FIG. 3 is merely an example and is not intended to limit the scope of embodiments of the present disclosure in any way. In other embodiments, the computing device 110 may perform the method 200 based on any suitable system architecture.

Referring to FIG. 2 and FIG. 3, at 210, the computing device 110 divides the set of files 120 to be backed up into a plurality of subsets of files, that is, a first subset of files 310, a second subset of files 320, a third subset of files 330, a fourth subset of files 340, a fifth subset of files 350, and so on. It is to be understood that the specific number of subsets of files and the specific number of other elements shown in FIG. 3 are merely examples and are not intended to limit the scope of the present disclosure in any way. In other embodiments, the set of files 120 may be divided into any suitable number of subsets of files, and any other elements in FIG. 3 may have any other suitable number.

In embodiments of the present disclosure, files in each of the plurality of subsets of files 310 to 350 have the same file type. For example, files in the first subset of files 310 may have a first file type, files in the second subset of files 320 may have a second file type, files in the third subset of files 330 may have a third file type, files in the fourth subset of files 340 may have a fourth file type, and files in the fifth subset of files 350 may have a fifth file type, and so on. In some embodiments, the first to fifth file types may be different file types.

Generally, the computing device 110 may use any file type division manner to divide the set of files 120 to be backed up. As an example, the files in the set of files 120 to be backed up may be divided into file types according to file formats indicated by filename extensions of the files in a computer system. For example, the first file type can be a file type with an extension of EXE, the second file type can be a file type with an extension of DOC, the third file type can be a file type with an extension of AVI, the fourth file type can be a file type with the extension MP3, and the fifth file type may be the file type with the extension SQL, and so on. In this way, the computing device 110 can reuse the existing file types in a computer system without setting a file type for a file again for a file backup, thereby simplifying the implementation of the embodiments of the present disclosure.

Alternatively or additionally, a file type for performing a file backup does not need to have a one-to-one mapping with a specific file extension, instead it may be mapped to a preconfigured general file type. In other words, a file type for a file backup may include a user-defined file type. For example, the file type may be "video," meaning that it may cover all file types related to videos, for example, AVI files, WMV files, MKV files, or the like. As another example, the file type may be "office files," meaning that it may cover all file types related to an office, for example, PPT files, DOC files, or the like. The mapping of a file type for a file backup to a general file type has significant advantages. For example, a user can customize a file type according to his own preference, to realize a particular purpose of file classification of a particular user.

In addition, for a given file, its file type may be one of preconfigured file types, or may be a file type with a type name of "others." As such, the computing device 110 may classify files that are not suitable to be classified into an explicit user-customized file type into the "others" type. In some descriptions below, it is assumed that the first file type of the first subset of files 310 is a picture (PIC) file type, the second file type of the second subset of files 320 is a video (VIDEO) file type, and the fifth file type of the fifth subset of files 350 is other (OTHERS) file type. It is to be understood, however, that the specific file types in these descriptions are merely examples and are not intended to limit the scope of the present disclosure in any way. In other embodiments, the first to fifth file types and more file types for a file backup may be any suitable file type.

In some embodiments, the computing device 110 may also use the two file type division manners or other file type division manners in combination. For example, a certain file in the set of files 120 may have two file types of "MP3" and "audio." In this case, in the subsequent file backup process, the file can be backed up into a backup file corresponding to the MP3 file type or into a backup file corresponding to the audio file type. In this manner, during the file recovery process, the computing device 110 may provide the user with more file types that can be recovered.

In general, a backup process of a file system may contain several stages, in which a file iteration stage is included. During a file iteration, the computing device 110 may perform a series of operations on a file in the set of files 120 to be backed up, for example, creating metadata of the file, checking file duplication by checking a file cache, chunking the file, or the like. The created file metadata usually can include information related to the file, such as the file name, the file size, the owner, a group, an access control list (ACL), or similar information.

Therefore, in some embodiments, no matter what kind of file type division manner is used to divide the set of files 120, when performing a file backup, the computing device 110 may determine a file type of each file in the set of files 120 to be backed up. The computing device 110 may then generate metadata associated with each file to include information indicating the file type of the file. For example, the computing device 110 may add a new field "ftype" into the metadata of the file to indicate the file type of the file. As such, the computing device 110 can make full use of the existing metadata of the file to be backed up to identify the type of the file, without additionally setting an identifier for indicating the file type. A specific example of using the metadata to identify a file type is described below with reference to FIG. 4.

Figure 4:
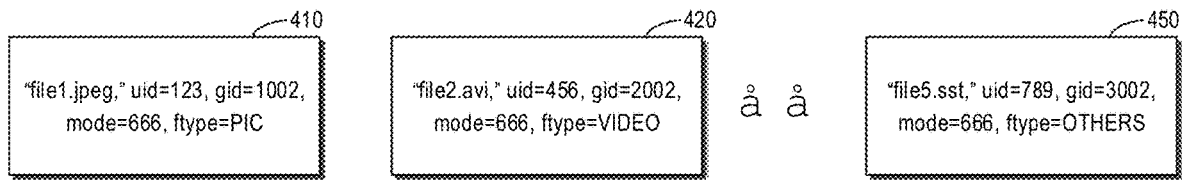
FIG. 4 illustrates example file metadata comprising file-type information in accordance with an embodiment of the present disclosure.

FIG. 4 illustrates example file metadata comprising file type information in accordance with an embodiment of the present disclosure. As shown in FIG. 4, assuming that a certain file (hereinafter also referred to as a first file) in the first subset of files 310 has a first file type of a picture (PIC) file type, then first metadata 410 of the first file may include information indicating the file type of the first file, for example, "ftype=PIC." Likewise, the metadata of other files in the first subset of files 310 may also include information indicating the file type, for example, "ftype=PIC."

Similarly, assuming that a certain file (hereinafter also referred to as a second file) in the second subset of files 320 has a second file type of a video (VIDEO) file type, then the second metadata 420 of the second file may include information indicating the file type of the second file, for example, "ftype=VIDEO." Likewise, the metadata of other files in the second subset of files 320 may also include information indicating the file type, for example, "ftype=VIDEO."

Similarly, assuming that a certain file (hereinafter also referred to as the fifth file) in the fifth subset of files 350 has a fifth file type of other (OTHERS) file type, then the fifth metadata 450 of the fifth file may include information indicating the file type of the fifth file, for example, "ftype=OTHERS." Likewise, the metadata of other files in the fifth subset of files 350 may also include information indicating the file type, for example, "ftype=OTHERS."

It is to be understood that the first metadata 410, the second metadata 420, and the fifth metadata 450 depicted in FIG. 4 are merely examples and are not intended to limit the scope of the present disclosure in any way. For example, the first metadata 410 is depicted as further including information such as the file name (file1.jpeg), a user ID (uid), a group ID (gid), and the mode (mode), the second metadata 420 is depicted as further including information such as the file name (file2.avi), a user ID, a group ID, and the mode, and the fifth metadata 450 is depicted as also including information such as the file name (file5.sst), a user ID, a group ID, and the mode (mode), or the like. However, in other embodiments, the first metadata 410, the second metadata 420 and the fifth metadata 450 or the like may include more file information, less file information, and different file information from that as shown.

In some embodiments, if the metadata of the files in the set of files 120 to be backed up includes file type information, the computing device 110 may divide the set of files 120 into the plurality of subsets of files 310 to 350 corresponding to different file types, based on the metadata of the files. In this way, once the file type information of a file to be backed up has been recorded in the metadata of the file, the computing device 110 can use the type information in the metadata of the file to perform a plurality of backups of the file, thereby avoiding re-determining the file type whenever performing a file backup.

Referring back to FIG. 2 and FIG. 3, at 220, the computing device 110 generates a plurality of backup files (also referred to as sub-container files) 315 to 355 and so on based on the plurality of subsets of files 310 to 350 and so on, respectively. For example, the backup files 315 to 355 and the like may be stored in the backup storage device 130. Specifically, the computing device 110 may generate a first backup file 315 based on the first subset of files 310, generate a second backup file 325 based on the second subset of files 320, generate a third backup file 335 based on the third subset of files 330, generate a fourth backup file 345 based on the fourth subset of files 340, and generate a fifth backup file 355 based on the fifth subset of files 350, and so on.

Therefore, the plurality of backup files 315 to 355 and the like may correspond to the plurality of file types of the files in the plurality of subsets of files 310 to 350 and the like, respectively. That is, the first backup file 315 may correspond to the first file type, the second backup file 325 may correspond to the second file type, the third backup file 335 may correspond to the third file type, the fourth backup file 345 may correspond to the fourth file type, and the fifth backup file 355 may correspond to the fifth file type, and so on. Such a manner of generating the backup files 315 to 355 and the like respectively according to file types has significant technical advantages over traditional backup manners as described in detail below.

For one backup session of a file system, traditionally there is only one backup file to hold all the file content, the logic behind is to keep similar file sequences between different backup sessions to reserve the locality between files, thereby improving deduplication and throughput rate. As a result, all the files are fed into one writing stream for one backup file. However, mixing different types of files together to perform a backup is not good for improving deduplication and throughput.

For example, assuming there are 4 files: f1, f2, f3 and f4, in which f1 and f3 have the same file type and thus share more duplicated file segments, and f2 and f4 have the same file type and thus share more duplicated file segments. But f1 shares little common file segments with f2, and so do f3 with f4. For simplicity, it is assumed that the in-memory file segment index cache is just for one file range, and the 4 files are iterated and written in a sequence from 1 to 4.

In particular, the backup system may first perform deduplication on f1, write all file segments of f1 into the backup file, and then a file segment index for f1 is cached. Next, the backup system may perform deduplication on f2 and no same file segment is found in the file segment index cache. Therefore, all file segments of f2 are written into the backup file, and the file segment index cache is replaced by f2. Then, the backup system may perform deduplication on f3 and no matched file segment is found in the file segment index cache. Thus, it is needed to query from the backup file for duplicated file segments, which may lead to slow disk inputs/outputs (I/Os). Afterwards, the file segment index cache is replaced by f3. Next, the backup system may perform deduplication on f4 and no matched file segment is found in the file segment index cache. Then, it is needed to query from the backup file for duplicated file segments, which may result in slow disk I/Os. Afterwards, the file segment index cache is replaced by f4.

It can be seen that in some extreme scenarios, each file ingest misses the in-memory file segment index cache and thus leads to a potentially large number of slow disk I/Os to query duplicated file segments from the backup file. In contrast, files with the same type being backed up into a separate backup file may not have the same disadvantage because the file type based locality may be kept while improving deduplication and throughput rate.

For example, follow up with the example above, f1 and f3 are backed up in the same backup file, and f2 and f4 are backed up in another backup file in the embodiments of the present disclosure. The computing device 110 may first perform deduplication on f1, write all file segments into a backup file, and a file segment index for f1 is cached. Next, the computing device 110 may perform deduplication on f3 and a large number of the same file segments are found in the file segment index cache of f1. Therefore, the same file segments may be synthesized and only a few new file segments are written into the backup file. Similarly, the same benefit also exists in the backup process for f2 and f4.

In addition, in some embodiments, when generating the plurality of backup files 315 to 355 and so on, the computing device 110 may create a plurality of parallel threads corresponding to the plurality of subsets of files 310 to 350 and so on, for performing backups of the subsets of files 310 to 350 and so on, respectively. Then, the computing device 110 may generate a corresponding backup file based on the files in the subset of files, through a corresponding thread for each subset of files. In other words, the computing device 110 may use the plurality of threads to back up, in parallel, the first subset of files 310 to the first backup file 315, the second subset of files 320 to the second backup file 325, the third subset of files 330 to the third backup file 335, the fourth subset of files 340 to the fourth backup file 345, and the fifth subset of files 350 to the fifth backup file 355, and so on. This parallel backup manner has obvious technical advantages over the traditional backup manners, which are detailed as below.

In a traditional one-backup file process, only one writing stream is established by the backup system to keep the locality between files, with the sacrifice of using a single thread. In contrast, in the embodiment in the present disclosure, because the computing device 110 groups different files into subsets of files by file type, a plurality of ingest streams can be established to generate a plurality of backup files in parallel. If the data link used to transfer backup files or data content is not a bottleneck, ideally the backup duration for the set of files 120 can be reduced to 1/N, where N is the number of file types. Additionally, within each subset of files, the sequence of file handling is unchanged, so the locality between files is also kept.

In some embodiments, after generating the plurality of backup files 315 to 355 and so on, for each of the plurality of subsets of files 310 to 350 and so on, the computing device 110 may determine an identifier of the backup file corresponding to the subset of files. For example, the computing device 110 may determine an identifier of the first backup file 315 corresponding to the first subset of files 310, an identifier of the second backup file 325 corresponding to the second subset of files 320, an identifier of the third backup file 335 of the third subset of files 330, an identifier of the fourth backup file 345 corresponding to the fourth subset of files 340, an identifier of the fifth backup file 355 corresponding to the fifth subset of files 350, and so on.

The computing device 110 may then add the identifier of the backup file into the metadata of the files in the corresponding subset of files. For example, the computing device 110 may add the identifier of the first backup file 315 into the metadata of the files in the first subset of files 310, add the identifier of the second backup file 325 into the file metadata of the files in the second subset of files 320, add the identifier of the third backup file 335 into the metadata of the files in the third subset of files 330, add the identifier of the fourth backup file 345 into the metadata of the file of the fourth subset of files 340, and add the identifier of the fifth backup file 355 into the metadata of the files in the fifth subset of files 350, and so on. A specific example of adding the backup file identifier to the metadata of the corresponding file is described below with reference to FIG. 5.

Figure 5:
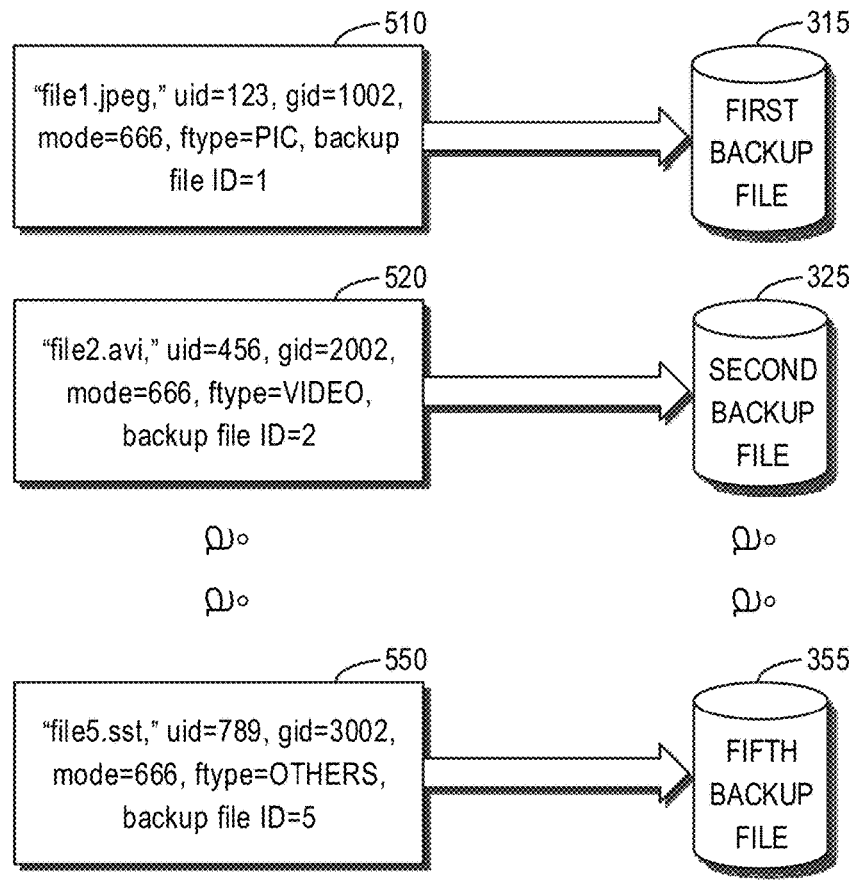
FIG. 5 illustrates example file metadata comprising a backup file identifier in accordance with an embodiment of the present disclosure.

FIG. 5 illustrates example file metadata comprising a backup file identifier in accordance with an embodiment of the present disclosure. As shown in FIG. 5, the example used in describing FIG. 4 is continued to be used. After the first file of the picture type (PIC) is backed up to the first backup file 315, the computing device 110 may add the identifier of the first backup file 315 into the metadata 510 of the first file. For example, the metadata 510 may include the information "backup file ID=1." Similarly, after the second file of the video type (VIDEO) is backed up to the second backup file 325, the computing device 110 may add the identifier of the second backup file 325 into the metadata 510 of the second file. For example, the metadata 520 may include the information "backup file ID=2." Likewise, after the fifth file having the file type "OTHERS" is backed up to the fifth backup file 355, the computing device 110 may add the identifier of the fifth backup file 355 into the metadata 550 of the fifth file. For example, the metadata 550 may include the information "backup file ID=5."

In this way, in a subsequent file recovery operation, the computing device 110 may determine, from the metadata of a file, from which backup file a certain file should be recovered, so that the embodiments of the present disclosure can also be applied to a file recovery manner not based on file types. For example, in such a recovery manner, the computing device 110 may provide the user with a directory and list of recoverable files, so that the user can select one or more specific files to be recovered without first selecting the file type to be recovered. In this case, the computing device 110 may determine, from the metadata of the file selected by the user, from which backup file the file selected by the user is to be recovered.

Referring back to FIG. 2 and FIG. 3, at 230, the computing device 110 generates an overall backup file 360 corresponding to the set of files 120 to be backed up, based on the plurality of backup files 315 to 355 and the like. That is, the computing device 110 may generate the overall backup file 360 based on the first backup file 315, the second backup file 325, the third backup file 335, the fourth backup file 345 and the fifth backup file 355, to complete a full backup 370 of the set of files 120. For example, the full backup 370 may correspond to one backup session.

In some embodiments, it may be advantageous for the computing device 110 to generate the overall backup file 360. For example, although the computing device 110 may generate a plurality of backup files corresponding to different file types in one backup session, the overall backup file representing the whole backup session may still be needed in some cases. For example, many backup operations, such as management operations like retention, expiration, replication, cloud-movement, need to be done in the unit of backup, not in the plurality of backup files corresponding to the file type. Also, the overall backup file 360 may maintain the information on which backup file represents which file type.

Generally, the computing device 110 may generate the overall backup file 360 from the plurality of backup files 315 to 355 and so on in any suitable manner. For example, the computing device 110 may copy the contents of the backup files 315 to 355 and so on into the overall backup file 360. Through this direct manner, the computing device 110 may provide double protection for the set of files 120. Alternatively, in other embodiments, the computing device 110 may create a reference file that logically points to the plurality of backup files 315 to 355 as the overall backup file 360, so as not to occupy additional storage space. A specific example in which the computing device 110 generates the reference file as the overall backup file 360 is described below with reference to FIG. 6.

Figure 6:
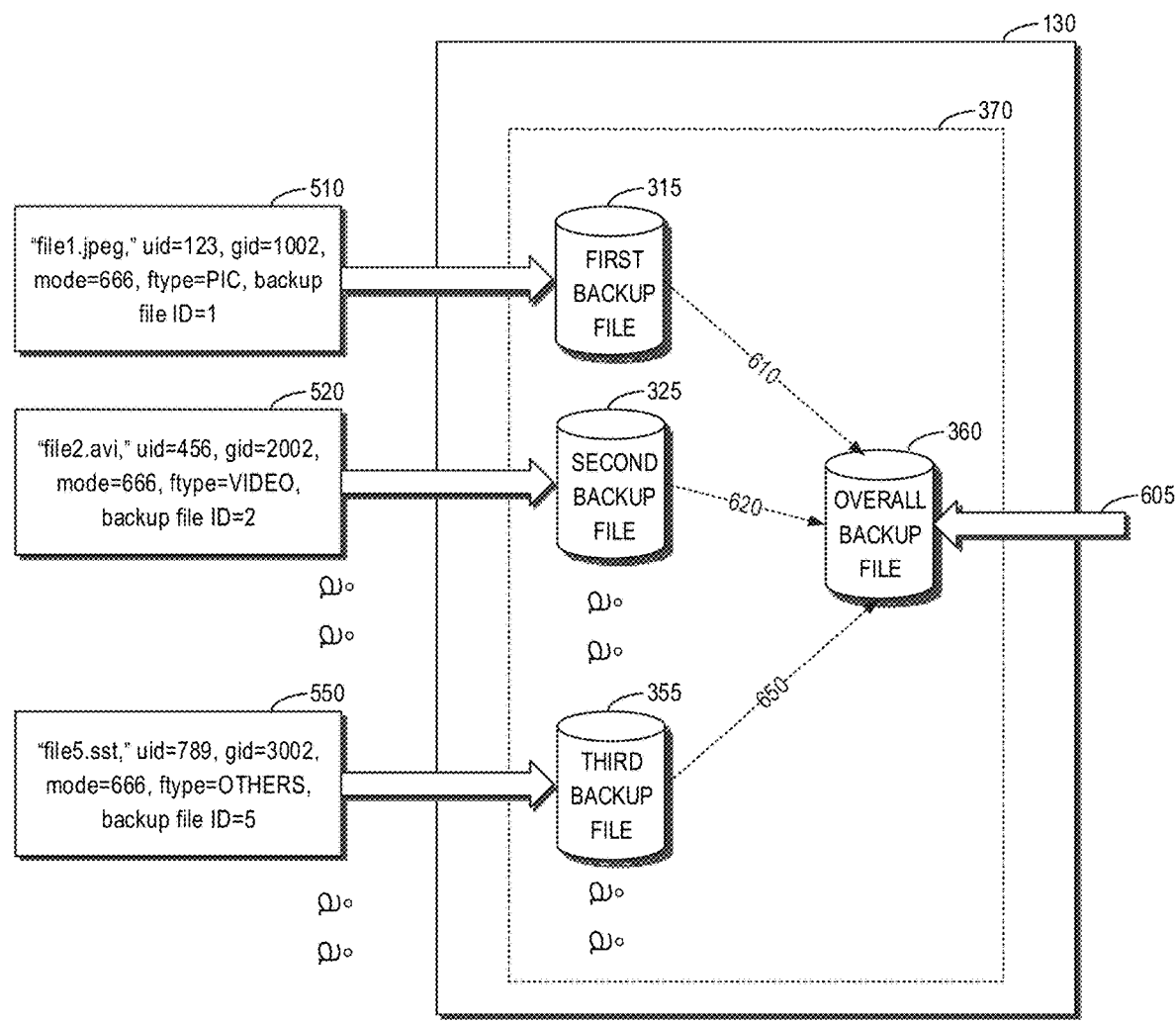
FIG. 6 illustrates a schematic diagram of generating a reference file as an overall backup file in accordance with an embodiment of the present disclosure.

FIG. 6 illustrates a schematic diagram of generating a reference file as the overall backup file 360 in accordance with an embodiment of the present disclosure. As shown in FIG. 6, the computing device 110 may first create a reference file, which for example occupies almost negligible low storage space. Then, the computing device 110 may cause the reference file to logically point to the plurality of backup files 315 to 355 and so on, through reference relationships 610, 620, and 650 and so on, thereby generating the overall backup file 360. In other words, the generated overall backup file 360 may be a combination of all the backup files of one backup session. However, this combination may be a logical concept, that is, the overall backup file 360 may not occupy any additional physical storage space. The computing device 110 may employ a variety of ways to achieve this goal, such as soft or hard links in operating system (OS) level, the fast-copy technology in storage systems, or the like. After generating the overall backup file 360, the management workflow 605 of the file backup system can be completed by accessing the overall backup file 360. For example, access to the overall backup file 360 may be linked to the plurality of backup files 315 to 355 and so on, to further access to the plurality of backup files 315 to 355 and so on.

In a file recovery operation as an example of the management workflow 605, the computing device 110 may recover files in the set of files 120 from the overall backup file 360 based on a file recover request from a user. In some embodiments, since the set of files 120 are backed up according to the file types, the computing device 110 may also recover the files in the set of files 120 according to the file types accordingly. For example, after receiving a request of file recovery from the user, the computing device 110 may determine a plurality of file types that can be recovered from the overall backup file 360, for example, the first type to the fifth type, and the like. To this end, the computing device 110 may read the supported file types for a backup from the overall backup file 360. For example, the computing device 110 may obtain this information from the metadata of the overall backup file 360.

Next, the computing device 110 may provide the user with information indicating the plurality of file types, so that the user selects a target file type from the plurality of file types to perform a file recovery operation. In this way, the user may flexibly select the file type to be recovered. For example, the computing device 110 may display those supported file types on a display device for the user to select. Continuing with the example as described above, the computing device 110 may display to the user the first file type (such as, the picture file type), the second file type (such as, the video file type), . . . , the fifth file type (such as, the other file type), and so on. It is to be appreciated that the computing device 110 can provide the user with the above information through any other suitable human-computer interaction manner, such as, voice interaction manner, haptic interaction manner, or the like.

If the user selects a target file type from the plurality of file types available for recovery, the computing device 110 may determine a target backup file corresponding to the target file type among the plurality of backup files 315 to 355 and so on. That is, the user selects one or more file types, and the computing device 110 may map them to specific backup files through the overall backup file 360. For example, assuming that the user selects a file of the second file type (such as, the video file type) to be recovered, the computing device 110 may determine the second backup file 325 corresponding to the second file type as the target backup file.

To this end, the computing device 110 may determine from the metadata of the second backup file 325 that it corresponds to the second file type. The computing device 110 may then recover a file with the target file type, such as the video file type, based on the target backup file 325. For example, the computing device 110 may directly recover all the video files backed up in the second backup file 325. In this way, the tedious and inconvenient browsing and selection operations required by the user in order to recover all files of a specific file type in the traditional backup manners are avoided.

Alternatively, the computing device 110 may recover specific one or more files having a certain file type based on the user's choice. To this end, assuming that the user selects the target file type 325, the computing device 110 can also determine the target backup file (for example, the second backup file 325) corresponding to the target file type (for example, the video file type) among the plurality of backup files 315 to 355 and so on.

Then, the computing device 110 may provide the user with information indicating the recoverable files in the backup file, so that the user selects a target file to be recovered among the recoverable files. For example, the computing device 110 may display a list of all files that can be recovered from the second backup file 325 on a display device. As such, the user may flexibly select files with a specific file type to be recovered.

Next, in the case that the user selects the target file to be recovered, the computing device 110 may recover the target file based on the target backup file. In this way, the flexibility for the user to recover files of a specific file type is improved, and the operations required when the user recovers one or more files of a specific file type are also simplified compared to the traditional backup manners.

In summary, embodiments of the present disclosure propose a technical solution for file backup, which starts from the origin of the backup process, and separately backs up files with different types into separate backup files, without causing additional backup overhead compared with the traditional backup manners. In this way, in addition to simplifying the file backup and recovery operations, due to the proper classification of the files to be backed up, the locality based on file type in file backups is also enhanced, and parallel multi-stream backups can also be utilized, so backup performance can be improved.

More specifically, the file-type based file backup and recovery solutions of the embodiments of the present disclosure complete the file type classification during the backup process and record the classification information of the files and the metadata of the files and the metadata of the backup files. In subsequent file recovery, the user can conveniently recover files having a specific file type with one click. Similarly, because files of different types are backed up in different backup files, files with similar data patterns are more likely to be located in the same location, thereby improving the deduplication rate.

For file backup operations of a file system, files are classified according to file types during the backup process. This classification can be integrated into the file iteration process, so it may not bring additional system overhead. The backup system can divide the files to be backed up into different subsets of files according to file types, and the plurality of subsets of files are represented and generated into corresponding backup files in a backup session. As a result, for a backup session, the backup system can generate an overall backup file, and the overall backup file can have one or more backup files, each of which contains file content of one file type. In some embodiments, the overall backup file may be a logical combination of all the backup files (for example, a snapshot mechanism), so it does not take up additional storage capacity.

For file recovery operations of the file system, the user can simply recover the entire backed up set of files by selecting the overall backup file, or the user can select to recover a file of a particular file type by selecting a backup file corresponding to the particular file type. In some embodiments, the metadata of the files may be retained in the backup file. Therefore, if the user only wants to recover a single file, file-level browsing and search operations realized based on the metadata can still be used.

Figure 7:
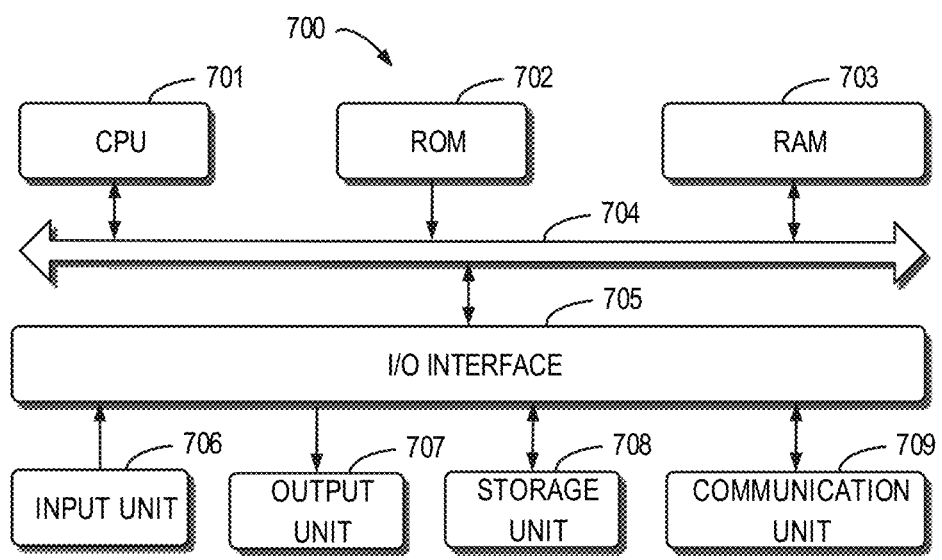
FIG. 7 illustrates a schematic block diagram of a device that can be used to implement embodiments of the present disclosure.

FIG. 7 schematically illustrates a schematic block diagram of a device 700 that can be used to implement embodiments of the present disclosure. In some embodiments, the device 700 may be an electronic device that may be used to implement the computing device 110 in FIG. 1. As shown in FIG. 7, the device 700 comprises a central processing unit (CPU) 701 that may perform various appropriate actions and processing based on computer program instructions stored in a read-only memory (ROM) 702 or computer program instructions loaded from a storage section 708 to a random access memory (RAM) 703. In the RAM 703, there further store various programs and data needed for operations of the device 700. The CPU 701, ROM 702 and RAM 703 are connected to each other via a bus 704. An input/output (I/O) interface 705 is also connected to the bus 704.

The following components in the device 700 are connected to the I/O interface 705: an input 706 such as a keyboard, a mouse and the like; an output unit 707 including various kinds of displays and a loudspeaker, or the like; a memory unit 708 including a magnetic disk, an optical disk, and or the like; a communication unit 709 including a network card, a modem, and a wireless communication transceiver, or the like. The communication unit 709 allows the device 700 to exchange information/data with other devices through a computer network such as the Internet and/or various kinds of telecommunications networks.

Various processes and processing described above, for example the method 200, may be executed by the processing unit 701. For example, in some embodiments, the method 200 may be implemented as a computer software program that is tangibly embodied on a machine readable medium, for example, the storage unit 708. In some embodiments, part or all of the computer programs may be loaded and/or mounted onto the device 800 via ROM 702 and/or communication unit 709. When the computer program is loaded to the RAM 703 and executed by the CPU 701, one or more steps of the method 200 as described above may be executed.

As used herein, the term "includes" and its variants are to be read as open-ended terms that mean "includes, but is not limited to." The term "based on" is to be read as "based at least in part on." The term "one example embodiment" and "an example embodiment" are to be read as "at least one example embodiment." The terms "first," "second" and the like may refer to different or identical objects. This article may also include other explicit and implicit definitions.

As used herein, the term "determining" encompasses a wide variety of actions. For example, "determining" can include computing, computing, processing, deriving, investigating, looking up (for example, looking up in a table, database, or another data structure), ascertaining, and the like. Further, "determining" can include receiving (for example, receiving information), accessing (for example, accessing data in memory), and the like. Further, "determining" may include parsing, selecting, selecting, establishing, and the like.

It will be noted that the embodiments of the present disclosure can be implemented in software, hardware, or a combination thereof. The hardware part can be implemented by a special logic; the software part can be stored in a memory and executed by a suitable instruction execution system such as a microprocessor or a special purpose hardware. Ordinary skilled in the art may understand that the above method and system may be implemented with computer executable instructions and/or in processor-controlled code, for example, such code is provided on a carrier medium such as an optical or electronic signal bearer.

Further, although operations of the present methods are described in a particular order in the drawings, it does not require or imply that these operations are necessarily performed according to this particular sequence, or a desired outcome can only be achieved by performing all shown operations. On the contrary, the execution order for the steps as depicted in the flowcharts may be varied. Alternatively, or in addition, some steps may be omitted, plurality of steps may be merged into one step, and/or a step may be divided into plurality of steps for execution. In practice, according to the embodiments of the present invention, the features and functions of two or more units described above may be embodied in one unit. In turn, the features and functions of one unit described above may be further embodied in more units.

Although the present disclosure has been described with reference to various embodiments, it should be understood that the present disclosure is not limited to the disclosed embodiments. The present disclosure is intended to cover various modifications and equivalent arrangements included in the spirit and scope of the appended claims.

We claim:

1. A method for file backup, comprising:
   dividing a set of files to be backed up into a plurality of subsets of files, wherein files in each of the plurality of subsets of files being of a same file type;
   generating a plurality of backup files based on the plurality of subsets of files, wherein each of the plurality of backup files corresponds to one of a plurality of file types; and
   generating an overall backup file corresponding to the set of files based on the plurality of backup files,
   wherein generating the plurality of backup files comprises:
      creating a plurality of parallel threads corresponding to the plurality of subsets of files; and
      for each of the plurality of subsets of files, generating a backup file corresponding to the subset of files based on the files in the subset of files, through a thread of the plurality of parallel threads corresponding to the subset of files.

2. The method of claim 1, further comprising:
   for each file in the set of files:
      determining a file type of the file; and
      generating metadata associated with the file, wherein the metadata comprises information indicating the file type of the file;
   wherein dividing the set of files into the plurality of subsets of files comprises:
      dividing the set of files into the plurality of subsets of files based on the metadata of the files in the set of files.

3. The method of claim 1, further comprising:
   after generating the plurality of backup files, for each of the plurality of subsets of files,
      determining an identifier of a backup file of the plurality of backup files corresponding to the subset of files; and
      adding the identifier into metadata of the files in the subset of files.

4. The method of claim 1, wherein generating the overall backup file comprises:
   creating a reference file logically pointing to the plurality of backup files as the overall backup file.

5. The method of claim 1, further comprising:
   in accordance with receiving a request of file recovery from a user, determining the plurality of file types corresponding to the plurality of backup files recoverable from the overall backup file; and
   providing the user with information indicating the plurality of file types.

6. The method of claim 5, further comprising:
   in accordance with a determination that the user selects a target file type, determining a target backup file of the plurality of backup files corresponding to the target file type; and
   recovering a file with the target file type based on the target backup file.

7. The method of claim 5, further comprising:
   in accordance with a determination that the user selects a target file type, determining a target backup file of the plurality of backup files corresponding to the target file type; and
   providing the user with information indicating recoverable files in the target backup file.

8. The method of claim 1, wherein one of the plurality of the file types is a user-defined file type.

9. An electronic device, comprising:
   at least one processor; and
   at least one memory storing computer program instructions, the at least one memory and the computer program instructions being configured, with the at least one processor, to cause the electronic device to:
      divide a set of files to be backed up into a plurality of subsets of files, wherein files in each of the plurality of subsets of files being of a same file type;
      generate a plurality of backup files based on the plurality of subsets of files, wherein each of the plurality of backup files corresponds to one of a plurality of file types; and
      generate an overall backup file corresponding to the set of files based on the plurality of backup files,
      wherein the electronic device generates the plurality of backup files by:
         creating a plurality of parallel threads corresponding to the plurality of subsets of files; and
         for each of the plurality of subsets of files, generating a backup file corresponding to the subset of files based on the files in the subset of files, through a thread of the plurality of parallel threads corresponding to the subset of files.

10. The electronic device of claim 9, wherein the at least one memory and the computer program instructions are further configured, with the at least one processor, to cause the electronic device to:
    for each file in the set of files:
       determine a file type of the file; and
       generate metadata associated with the file, wherein the metadata comprises information indicating the file type of the file;
    wherein the at least one memory and the computer program instructions are configured, with the at least one processor, to cause the electronic device to divide the set of files into the plurality of subsets of files by:
       dividing the set of files into the plurality of subsets of files based on the metadata of the files in the set of files.

11. The electronic device of claim 9, wherein the at least one memory and the computer program instructions are further configured, with the at least one processor, to cause the electronic device to:
    after generating the plurality of backup files, for each of the plurality of subsets of files,
       determine an identifier of a backup file of the plurality of backup files corresponding to the subset of files; and
       add the identifier into metadata of the files in the subset of files.

12. The electronic device of claim 9, wherein the at least one memory and the computer program instructions are configured, with the at least one processor, to cause the electronic device to generate the overall backup file by:
    creating a reference file logically pointing to the plurality of backup files as the overall backup file.

13. The electronic device of claim 9, wherein the at least one memory and the computer program instructions are further configured, with the at least one processor, to cause the electronic device to:

in accordance with receiving a request of file recovery from a user, determine the plurality of file types corresponding to the plurality of backup files recoverable from the overall backup file; and provide the user with information indicating the plurality of file types.

14. The electronic device of claim 13, wherein the at least one memory and the computer program instructions are further configured, with the at least one processor, to cause the electronic device to:

in accordance with a determination that the user selects a target file type, determine a target backup file of the plurality of backup files corresponding to the target file type; and recover a file with the target file type based on the target backup file.

15. The electronic device of claim 13, wherein the at least one memory and the computer program instructions are further configured, with the at least one processor, to cause the electronic device to:

in accordance with a determination that the user selects a target file type, determine a target backup file of the plurality of backup files corresponding to the target file type; and provide the user with information indicating recoverable files in the target backup file.

16. The electronic device of claim 9, wherein one of the plurality of the file types is a user-defined file type.

17. A computer program product tangibly stored on a non-volatile computer readable medium and comprising machine executable instructions that, when executed, cause a machine to perform a method, the method comprising:

dividing a set of files to be backed up into a plurality of subsets of files, wherein files in each of the plurality of subsets of files being of a same file type;

generating a plurality of backup files based on the plurality of subsets of files, wherein each of the plurality of backup files corresponds to one of a plurality of file types; and generating an overall backup file corresponding to the set of files based on the plurality of backup files, wherein generating the plurality of backup files comprises:

creating a plurality of parallel threads corresponding to the plurality of subsets of files; and for each of the plurality of subsets of files, generating a backup file corresponding to the subset of files based on the files in the subset of files, through a thread of the plurality of parallel threads corresponding to the subset of files.

* * * * *